(12) United States Patent
Martini et al.

(10) Patent No.: US 8,666,315 B2
(45) Date of Patent: Mar. 4, 2014

(54) MANAGING ANONYMOUS COMMUNICATIONS BETWEEN USERS BASED ON SHORT-RANGE WIRELESS CONNECTION IDENTIFIERS

(75) Inventors: Giovanni Martini, Turin (IT); Piergiorgio Bosco, Turin (IT); Ennio Grasso, Turin (IT); Alessandro Perrucci, Turin (IT); Claudio Benenti, Turin (IT)

(73) Assignee: Telecom Italia S.p.A., Milan (IT)

( * ) Notice: Subject to any disclaimer, the term of this patent is extended or adjusted under 35 U.S.C. 154(b) by 1069 days.

(21) Appl. No.: 11/990,625

(22) PCT Filed: Aug. 19, 2005

(86) PCT No.: PCT/EP2005/009008
§ 371 (c)(1),
(2), (4) Date: Apr. 13, 2009

(87) PCT Pub. No.: WO2007/019877
PCT Pub. Date: Feb. 22, 2007

(65) Prior Publication Data
US 2009/0209202 A1    Aug. 20, 2009

(51) Int. Cl.
*H04B 7/00* (2006.01)
*H04B 3/36* (2006.01)
*H04B 7/14* (2006.01)

(52) U.S. Cl.
USPC ............................. 455/41.2; 455/8; 455/41.3

(58) Field of Classification Search
USPC .............. 455/39, 435.1, 41.2, 41.3, 500, 502, 455/507, 67.11, 68
See application file for complete search history.

(56) References Cited

U.S. PATENT DOCUMENTS

| 6,766,160 | B1 | 7/2004 | Lemiläinen et al. | |
|---|---|---|---|---|
| 7,020,466 | B2 * | 3/2006 | Fujii | 455/433 |
| 7,342,895 | B2 * | 3/2008 | Serpa et al. | 370/254 |
| 2002/0007396 | A1 | 1/2002 | Takakura et al. | |
| 2003/0104820 | A1 * | 6/2003 | Greene et al. | 455/456 |

(Continued)

FOREIGN PATENT DOCUMENTS

| EP | 1 146 692 B1 | 10/2004 |
|---|---|---|
| WO | WO-01/24551 A1 | 4/2001 |

OTHER PUBLICATIONS

Eagle et al; "Social Serendipity: Proximity Sensing and Cueing"; MIT Media Laboratory technical Note 580. pp. 1-18, May 2004.

*Primary Examiner* — Andrew Wendell
(74) *Attorney, Agent, or Firm* — Finnegan, Henderson, Farabow, Garrett & Dunner, L.L.P.

(57) ABSTRACT

A method for managing in network equipment of a communication network anonymous communications between a first and a second mobile user apparatus includes: a) receiving from the first mobile user apparatus, through a first network connection, data indicating that a short-range wireless connection between the first mobile user apparatus and the second mobile user apparatus has been established, the data including a second unique short-range wireless connection identifier associated with the second mobile user apparatus and a message for the second mobile user apparatus; b) by using the second unique short-range wireless connection identifier, obtaining a network address associated with the second mobile user apparatus; and c) by using the network address obtained in b), sending data to the second mobile user apparatus through a second network connection, the data including the message received in a) from the first mobile user apparatus and a first anonymous identifying code univocally associated with the first mobile user apparatus.

27 Claims, 5 Drawing Sheets

(56) References Cited

U.S. PATENT DOCUMENTS

| | | | |
|---|---|---|---|
| 2003/0124979 A1* | 7/2003 | Tanada et al. ............... 455/41 |
| 2003/0236890 A1* | 12/2003 | Hurwitz et al. ............. 709/227 |
| 2004/0106408 A1* | 6/2004 | Beasley et al. .............. 455/436 |
| 2005/0003822 A1 | 1/2005 | Aholainen et al. |
| 2005/0076124 A1 | 4/2005 | Enderlein et al. |
| 2005/0136834 A1* | 6/2005 | Bonta et al. ................ 455/11.1 |
| 2005/0191963 A1* | 9/2005 | Hymes ...................... 455/41.2 |
| 2005/0197154 A1* | 9/2005 | Leon et al. ................ 455/552.1 |
| 2006/0203841 A1* | 9/2006 | Fischer ...................... 370/461 |
| 2006/0234631 A1* | 10/2006 | Dieguez ..................... 455/41.2 |
| 2008/0076418 A1* | 3/2008 | Beyer, Jr. .................. 455/435.1 |

\* cited by examiner

MANAGING ANONYMOUS COMMUNICATIONS BETWEEN USERS BASED ON SHORT-RANGE WIRELESS CONNECTION IDENTIFIERS

CROSS REFERENCE TO RELATED APPLICATION

This application is a national phase application based on PCT/EP2005/009008, filed Aug. 19, 2005.

BACKGROUND OF THE INVENTION

1. Field of the Invention

The present invention relates to a method and a system for wireless communications.

2. Description of the Related Art

Wireless communications in the form of cellular phones and their supporting communications network have led to changes in the ways that people, particularly the young, meet, socialize and communicate.

For example, US2002/0007396 discloses a technique for chatting using a plurality of mobile terminals connected to a server device through a network. The server device generates a plurality of chat rooms divided based on a geographical standard related to the current position of each user; selects a chat room in which a user at a terminal is to participate, based on information relating to the current position of the terminal posted from each terminal; and mixes voices of users transmitted via terminals of respective users who participate in the same chat room selected at the step of selecting a chat room.

FriendZone service, developed by Valis LTD, Israel, allows user of cellular phones to establish communications with other cellular phone users by the mediation of a server device. The service allows the users to create buddy lists by adding friend, based on their approval, using phone numbers as identifier, to view their buddies' virtual presence, send them textual messages and view their location. Moreover, the service allows users to anonymously exchange textual messages in virtual chat room, to define their personal profile, to define a preferred matching profile, to perform an automatic match of two users, based on their profiles and their location. Further, the service allows users to send anonymous SMS (Short Message Service) to other users, without knowing their phone numbers.

Techniques enabling interactions among cellular phone users which make use of the so-called Bluetooth™ wireless technology are also known in the art.

Bluetooth is a standard and an industrial specification developed by a group of electronics manufacturers that allows any sort of electronic equipment, from computers and cell phones to keyboards and headphones, to connect and exchange information via wireless, short range (from 10 to 100 meters) radio frequency connections. Wireless communications among cellular phone users which make use of the Bluetooth™ technology allow free messages to be exchanged among the users. Moreover, they may be implemented by using relatively low power consumption and low cost transceiver in the user cellular phone.

Nathan Eagle and Alex Pentland (Research Work "Social Serendipity: Proximity Sensing and Cueing", MIT Media Laboratory Technical Note 580, May 2004) disclose a system that allows proximate people to be detected and identified by using the Bluetooth wireless technology and to be matched from a database of user profiles. Bluetooth enabled cellular phones continuously transmit via Bluetooth standard a unique identification code (BTID) that can be received by other Bluetooth cellular phones. Every time a cellular phone discovers a new device by the Bluetooth discovery function that was not previously detected such information is recorded in a proximity log and sent to a central server utilizing a mobile network connection. The server maintains a database containing users' profiles, and a similarity score is calculated on the basis of the user profiles and preferences. If the score is above the thresholds set by both users, the server alerts the users that there is someone in their proximity (according to the Bluetooth discovery indications) whom might be of interest.

Moreover, BEDD™ service, by BEDD Corporation, allows cellular phone users to communicate and interact with each other by using Bluetooth wireless technology. The users have to fill-in a short profile describing who they are and who they would like to meet. The BEDD system, while running in the background of the cellular phones, automatically exchanges user profiles, as well as advertisements about things they would like to buy or sell, with others that come within the Bluetooth range of distances. Then, it alerts a user when others within the Bluetooth range are found which match with the user specific personalized criteria and enables free chats and instant messaging via Bluetooth wireless technology, within the Bluetooth range, or conventional mobile contacts via SMS, MMS, Call or E-mail.

SUMMARY OF THE INVENTION

The Applicant notes that these two latter techniques based on the Bluetooth technology have the drawback of not allowing two users which start an anonymous communication within the Bluetooth range of distances to maintain the established anonymous communication, once outside the Bluetooth range of distances. Indeed, the users cannot continue communicating unless they previously exchanged their telephone numbers and/or email addresses to take up again the communication via a conventional non-anonymous contact. Also, these two techniques do not provide the possibility to continue the established anonymous communication with increased communication capabilities, such as exchanging large size messages or the like which require large bandwidth and/or greater functionality.

The Applicant thus faced the technical problem of providing the users of mobile apparatuses with the capability of continuing an anonymous communication established with other users according to the Bluetooth wireless technology or to another comparable short-range wireless technology, even when the short-range connectivity is lost or increased communication functionality is needed.

Therefore, in a first aspect the present invention relates to a method for managing in a network equipment of a communication network anonymous communications between a first and a second mobile user apparatus, the method comprising a) receiving from the first mobile user apparatus, through a first network connection, data indicating that a short-range wireless connection between the first mobile user apparatus and the second mobile user apparatus has been established, said data comprising a second unique short-range wireless connection identifier associated with the second mobile user apparatus and a message for the second mobile user apparatus;

b) by using said second unique short-range wireless connection identifier, obtaining a network address associated with the second mobile user apparatus; and c) by using the network address obtained in b), sending data to the second mobile user apparatus through a second network connection, said data comprising the message received in a) from the first mobile user apparatus and a first anonymous identifying code univocally associated with the first mobile user apparatus.

According to the method of the invention, when an anonymous short-range wireless connection between two mobile user apparatuses fails or is not anymore the preferred one, the mobile user apparatuses may continue communicating anonymously through the intermediation of a network equipment which allows the users to maintain their anonymity by sending to the mobile user apparatuses, in addition to the messages to be exchanged between the users, anonymous identifying codes associated with the sender mobile user apparatuses. Indeed, the use of suitable anonymous identifying codes managed by the network equipment allows the identity of the apparatuses to be recognized at the network equipment without revealing it to the users of the mobile user apparatuses.

In the present description and claims, the term

"short-range wireless connection" is used to indicate a wireless connection which can be established between two entities according to the Bluetooth wireless technology or to another comparable short-range wireless technology, within a short-range of distances typically comprised between 10 and 100 m, such as during a Bluetooth discovery or messaging;

"short-range wireless connection identifier", referred to a mobile user apparatus, is used to indicate an anonymous identifying code, typically alphanumeric, which univocally and anonymously identifies the apparatus in a communication system based on short-range wireless connections, such as for example the Bluetooth transceiver identifying code;

"network connection" is used to indicate a connection, typically at least in part wireless, which can be established in a communication network between a mobile user apparatus and a network equipment. A typical example of network connection is a packet data network connection as provided, for example, by Wi-Fi, GPRS, UMTS, EDGE technologies, or a combination thereof, or a messaging system connection which allows text and/or multimedia messages to be sent through a short message system (SMS), a multimedia message system (MMS) or similar, according to technologies well known in the art. The network connection established between a mobile user apparatus and a network equipment may dynamically change in type (e.g., from GPRS to UMTS or to SMS);

"network address", referred to a mobile user apparatus, is used to indicate a code which univocally identifies the apparatus in a communication network, at least temporarily. Typical examples of network addresses are IP addresses used in packet data network connections and MSISDN (Mobile Subscriber ISDN number) subscriber identifiers used in voice/messaging system connections;

"anonymous communication" is used to indicate a communication among two mobile user apparatuses, wherein the network address of at least one of the two mobile user apparatuses is kept secret from the other mobile user apparatus;

"anonymous identifying code" is used to indicate a code identifying a mobile user apparatus within an anonymous communication.

"messaging system connection" is used to indicate a connection which can be established in a communication network between a mobile user apparatus and a network equipment for sending text and/or multimedia messages through a short message system (SMS), a multimedia message system (MMS) or similar, according to technologies well known in the art;

"message" is used to comprise textual data, multimedia (e.g. photo, audio, video) data and/or voice packet data, as provided, for example by the Voice over IP protocol well known in the art;

"network equipment" is used to indicate at least one network apparatus;

"mobile network" is used to indicate a network adapted to provide network connections, at least in part wireless, between a network equipment and a mobile user apparatus realized using various technologies (e.g. Wi-Fi, GPRS, GSM, EDGE, UMTS, or a combination thereof);

"connection", with reference to two entities, is used to indicate that the two entities can send and/or receive information to/from each other directly or through other entities.

Advantageously, the method also comprises d) receiving data from the second mobile user apparatus through the second network connection, said data comprising the first anonymous identifying code and a message for the first mobile user apparatus.

Advantageously, the method also comprises e) obtaining a network address associated with the first mobile user apparatus by using the first anonymous identifying code.

Advantageously, the method also comprises f) sending data to the first mobile user apparatus through the first network connection using the network address obtained in e), said data comprising the message received in d) from the second mobile user apparatus and a second anonymous identifying code univocally associated with the second mobile user apparatus.

Advantageously, the method also comprises g) receiving data from the first mobile user apparatus through the first network connection, said data comprising the second anonymous identifying code and a message for the second mobile user apparatus.

Advantageously, after step g) is performed, the method also comprises obtaining a network address associated with the second mobile user apparatus by using said second anonymous identifying code and—by using the network address obtained in b)—sending data to the second mobile user apparatus through the second network connection, said data comprising the message received in g) from the first mobile user apparatus.

Advantageously, a) comprises receiving a notification from at least one of the two mobile user apparatuses that the short-range wireless connection failed.

In an embodiment, the first network connection in a) is a packet data network connection, such as GPRS, EDGE or UMTS. In this case, in a) the data advantageously further comprise a first unique short-range wireless connection identifier associated with the first mobile user apparatus. Typically, the first network connection is an IP (Internet Protocol) packet data network connection.

According to another embodiment, the first network connection in a) is a messaging system connection. In this case, the network equipment is advantageously adapted to retrieve—as well known in the art—a first MSISDN (Mobile Subscriber ISDN number) subscriber identifier univocally identifying the first mobile user apparatus.

Advantageously, b) comprises retrieving from a user information database the network address stored therein in correspondence of the second short-range wireless connection identifier received in a).

Advantageously, the method further comprises receiving the network address associated with the second mobile user apparatus from the second mobile user apparatus through the second network connection and storing it into said user information database. Advantageously, this step is performed before b).

Advantageously, b) comprises checking whether a packet data network connection is established with the second mobile user apparatus.

If a packet data network connection is established with the second mobile user apparatus, the network address obtained in b) is advantageously a packet data network connection address, associated with the second mobile user apparatus. For example, the packet data network connection is an IP packet data network connection and the network address is an IP address. In c) the data are advantageously sent to the second mobile user apparatus through the established packet data network connection by using said packet data network connection address. Moreover, in c) the first anonymous identifying code is the first unique short-range wireless connection identifier.

According to an embodiment, if a packet data network connection is not established with the second mobile user apparatus, the method comprises forcing the second mobile user apparatus to establish a packet data network connection with the network equipment so that in c) the data are sent to the second mobile user apparatus through the forced packet data network connection.

According to another embodiment, for example if a packet data network connection is not established with the second mobile user apparatus, the network address obtained in b) is a second MSISDN subscriber identifier associated with the second mobile user apparatus. In c) the data are advantageously sent to the second mobile user apparatus through a messaging system connection by using said second MSISDN subscriber identifier. Moreover, in c) the first anonymous identifying code is a first messaging system connection identifier. Preferably, said first messaging system connection identifier is a numeric code univocally identifying the first mobile user apparatus at the network equipment. Advantageously, said first messaging system connection identifier is retrieved from user information database.

According to an embodiment, the second network connection in d) is a packet data network connection. In this case, in d) the data further comprise the second unique short-range wireless connection identifier. Typically, the network connection is an IP packet data network connection.

According to another embodiment, the second network connection in d) is a messaging system connection. In this case, in d) the network equipment is advantageously adapted to retrieve—as well known in the art—the second MSISDN subscriber identifier.

Advantageously, e) comprises retrieving from a user information database the network address stored therein in correspondence of the first anonymous identifying code received in d).

Advantageously, the method further comprises receiving the network address from the first mobile user apparatus through the first network connection and storing it into said user information database.

Advantageously, e) comprises checking whether a packet data network connection is established with the first mobile user apparatus.

If a packet data network connection is established with the first mobile user apparatus, the network address obtained in e) is advantageously a packet data network connection address, associated with the first mobile user apparatus. For example, the packet data network connection is an IP packet data network connection and the network address is an IP address. In f) the data are advantageously sent to the first mobile user apparatus through the established packet data network connection by using said packet data network connection address. Moreover, in f) the second anonymous identifying code is the second unique short-range wireless connection identifier.

If a packet data network connection is not established with the first mobile user apparatus, the network address obtained in e) is the first MSISDN subscriber identifier. In f) the data are advantageously sent to the first mobile user apparatus through a messaging system connection by using said first MSISDN subscriber identifier. Moreover, in f) the second anonymous identifying code is a second messaging system connection identifier. Preferably, said second messaging system connection identifier is a numeric code univocally identifying the second mobile user apparatus at the network equipment. Advantageously, said second messaging system connection identifier is retrieved from user information database.

Advantageously, the method further comprises obtaining information about the geographical position of the first mobile user apparatus. Said information may, for example, be obtained from the first mobile user apparatus or may be determined at the network equipment. The method advantageously further comprises storing the obtained geographical position information in user information database, in association with the first mobile user apparatus.

Advantageously, the method further comprises obtaining information about the geographical position of the second mobile user apparatus. Said information may, for example, be obtained from the second mobile user apparatus or may be determined at the network equipment. The method advantageously further comprises storing the obtained geographical position information in user information database, in association with the second mobile user apparatus.

Preferably, the method further comprises h) receiving from the first mobile user apparatus, through the first network connection, a request for a search of other mobile user apparatuses.

The first network connection in h) may be a packet data network connection or a messaging system connection.

Advantageously, the method further comprises i) searching for other mobile user apparatuses in user information database. Said user information database typically comprises information about a plurality of mobile user apparatuses. As disclosed in more detail below, for each mobile user apparatus said information typically is selected from the group comprising: internal user identifier, short-range wireless connection identifier, MSISDN subscriber identifier, messaging system connection identifier, packet data network connection address, geographical position information, flag indicating the on-line/off-line status within the communication network (that is, whether or not the user of the respective apparatus has given his authorization to be discovered during the search and/or reached by messages from other users of the communication network), introductory user message to be shared with other users.

Advantageously, in i) the search is restricted to those mobile user apparatuses having an on-line status.

Advantageously, in i) the search is performed based upon the geographical position information stored in said database.

Typically, on-line mobile user apparatuses closer to the position of the first mobile user apparatus or within a predetermined range of distances from the position of the first mobile user apparatus are searched for.

Advantageously, the method further comprises l) sending through the first network connection the result of the search performed in i) to the first mobile user apparatus. Said result typically comprises an anonymous search identifying code univocally associated with each of at least a sub-set of the mobile user apparatuses found in i), together with the respective introductory user message.

The network connection in l) may be a packet data network connection or a messaging system connection.

Advantageously, the method also comprises m) receiving data from the first mobile user apparatus through the first network connection, said data comprising the anonymous search identifying code univocally associated with a mobile user apparatus selected from those sent in l) and a message for such selected mobile user apparatus.

Advantageously, after step m) is performed, the method also comprises carrying out steps similar to b) and c), and optionally, to d), e) and f), on the selected mobile user apparatus instead of the second mobile user apparatus.

In a second aspect the present invention relates to a network equipment adapted to carry out the method according to the first aspect of the invention.

Advantageously, the network equipment comprises a storing unit for storing a user information database. Said user information database typically comprises information about a plurality of mobile user apparatuses, for each mobile user apparatus said information typically being selected from the group comprising: internal user identifier, short-range wireless connection identifier, MSISDN subscriber identifier, messaging system connection identifier, packet data network connection address, geographical position information, flag indicating the on-line/off-line status within the communication network, introductory user message to be shared with other users.

In a third aspect the present invention relates to a method for managing in a first mobile user apparatus anonymous communications with a second mobile user apparatus within a communication network comprising a network equipment, the first and second mobile user apparatus each having associated a first and a second unique short-range wireless connection identifier, respectively, the method comprising:

1) establishing a short-range wireless connection with the second mobile user apparatus; and
2) sending to the network equipment, through a network connection, data indicating that the short-range wireless connection with the second mobile user apparatus has been established, said data comprising the second unique short-range wireless connection identifier and a message for the second user apparatus.

Advantageously, 2) is performed after the short-range wireless connection with the second mobile user apparatus has failed. Step 2) may also be performed when the short-range wireless connection with the second mobile user apparatus is not anymore the preferred one.

Advantageously, the method comprises sending the first unique short-range wireless connection identifier to the network equipment, through the network connection. Advantageously, the network connection used in this step is a packet data network connection.

Advantageously, the method comprises sending an introductory user message to the network equipment through the network connection. The network connection used in this step may be a packet data network connection or a messaging system connection.

Advantageously, the method comprises sending to the network equipment data through a messaging system connection, such as for example a SMS (typically, an empty SMS). This allows the network equipment to retrieve a first MSISDN subscriber identifier associated with the first mobile apparatus.

Advantageously, at least one of the above mentioned steps of sending the first unique short-range wireless connection identifier, the introductory message and the data through a messaging system connection is performed before the execution of 2).

Advantageously, the method further comprises 3) receiving from said network equipment, through said network connection, data comprising an anonymous identifying code univocally associated with the second mobile user apparatus and a message from the second mobile user apparatus. Preferably, the method further comprises providing, through a suitable user interface, the user of the first mobile user apparatus with said message. The user interface may be, for example, a video display unit and/or a sound emission device.

Advantageously, the method further comprises 4) sending to said network equipment, through said network connection, data comprising the anonymous identifying code univocally associated with the second mobile user apparatus, as received in 3), and a reply message for the second mobile user apparatus.

Advantageously, 1) comprises performing a short-range wireless search for other mobile user apparatuses adapted to establish a short-range wireless connection with the first mobile user apparatus. Advantageously, in 1) the second mobile user apparatus is found through said short-range wireless search. Advantageously, 1) further comprises receiving from the second mobile user apparatus, through the established short-range wireless connection, the second unique short-range wireless connection identifier and, preferably, an introductory user message.

Advantageously, when the first mobile user apparatus is found from another mobile user apparatus performing a short-range wireless search for other mobile user apparatuses adapted to establish a short-range wireless connection with it, the method comprises sending the first unique short-range wireless connection identifier and, preferably, an introductory user message to said another mobile user apparatus, through a short-range wireless connection.

Advantageously, the method further comprises sending to the network equipment, through said network connection, a request for a search for other mobile user apparatuses. Advantageously, the method further comprises receiving from the network equipment, through said network connection, the result of said search. Typically, said result comprises an anonymous search identifying code, and an introductory user message, for each of at least a subset of the mobile user apparatuses found through said search. Advantageously, the method further comprises sending to the network equipment, through said network connection, an invitation message for a mobile user apparatus selected among the ones comprised in said search result and the anonymous search identifying code associated therewith.

Advantageously, the method further comprises sending to the network equipment, through said network connection, information about the geographical position of the first mobile user apparatus.

Advantageously, in 2) the network connection is a packet data network connection. In this case, 2) further comprises sending to the network equipment the first unique short-range wireless connection identifier.

According to a variant, in 2) the network connection is a messaging system connection.

Advantageously, in 3) the network connection is a packet data network connection. In this case, in 3) the received anonymous identifying code associated with the second mobile user apparatus is advantageously the second unique short-range wireless connection identifier or a second internal user identifier (IN_ID) (as defined more in detail below).

According to a variant, in 3) the network connection is a messaging system connection. In this case, in 3) the received anonymous identifying code associated with the second mobile user apparatus is advantageously a second messaging system connection identifier.

In a fourth aspect the present invention relates to a mobile user apparatus adapted to carry out the method according to the third aspect of the invention.

According to a preferred embodiment of the invention, the mobile user apparatus is a cellular phone.

The mobile user apparatus may also be, for example, a personal digital assistant or another similar device.

In a fifth aspect the present invention relates to a communication network comprising
- a network equipment according to the second aspect of the invention,
- at least two mobile user apparatuses according to the fourth aspect of the invention, and
- a mobile network, wherein the at least two mobile user apparatuses are each adapted to communicate to the network equipment through a respective network connection via the mobile network, are adapted to communicate to each other through a short-range wireless connection and have associated a first and a second unique short-range wireless connection identifier, respectively.

BRIEF DESCRIPTION OF THE DRAWINGS

The features and advantages of the present invention will be made apparent by the following detailed description of some exemplary embodiments thereof, provided merely by way of non-limitative examples, description that will be conducted by making reference to the attached drawings, wherein.

DETAILED DESCRIPTION OF THE INVENTION

Figure 1:
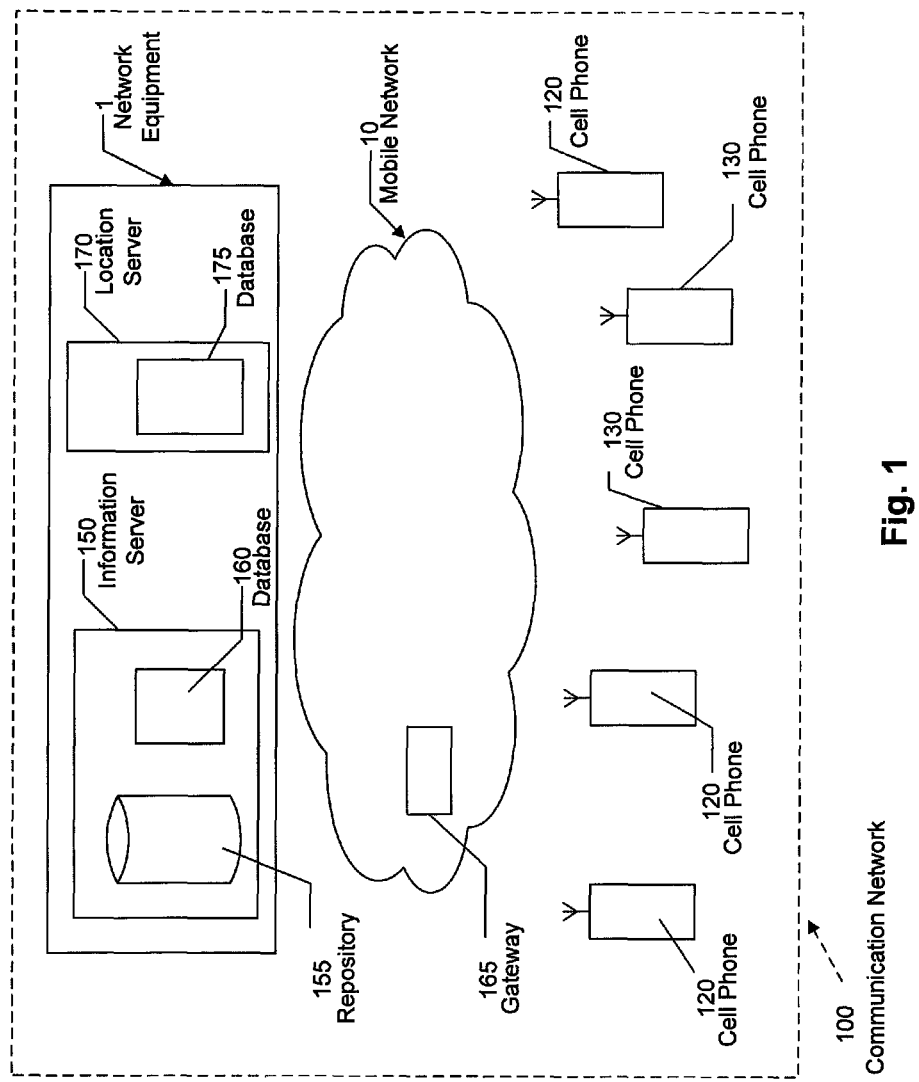
FIG. 1 schematically shows a communication network according to an embodiment of the invention.

FIG. 1 shows a communication network 100 according to an embodiment of the invention comprising a plurality of cellular phones (or similar mobile user apparatuses) 120, 130, a mobile network 10 and a network equipment 1.

Cellular phones 120 and 130 are adapted to communicate with the network equipment 1 through the mobile network 10.

The terms cellular phone and mobile user apparatus in the present description and claims are used to indicate a cellular phone and, respectively, a mobile user apparatus associated with a module (such as a Subscriber Identity Module—SIM), which in turn is typically univocally associated with a user of such phone or apparatus.

Cellular phones 120 comprise a short-range transceiver adapted to establish a short-range wireless connection according to the Bluetooth wireless technology or to a comparable short-range radio-frequency based wireless technology and have associated a Bluetooth (or equivalent) unique short-range wireless connection identifier. Moreover, they have the capability of communicating packet data through packet data network connections and/or to send/receive SMS, MMS and other equivalent type of messages. For example, they may be Symbian, J2ME, MS Smartphone or comparable cellular phones.

As these types of cellular phones are well known in the art, they will not be further described in detail hereinafter.

For the sake of simplicity, the following description will assume that the short-range radio-frequency wireless technology is Bluetooth and that the short-range transceivers in cellular phones 120 are Bluetooth transceivers. However, it should be clear that the invention applies to comparable short-range wireless technologies as well.

In the embodiment shown, cellular phones 130 have reduced capability with respect to cellular phones 120 in that they are not Bluetooth enabled. Typically they are also unable to run dedicated applications and to communicate packet data. Nonetheless, cellular phones 130 have the capability of sending and receiving SMS and, optionally, MMS or equivalent type of messages. For example, they are conventional GSM cellular phones without the support for Bluetooth (and unable to run dedicated applications).

The mobile network 10 may be a conventional GSM-GPRS, EDGE, UMTS, mobile dial-up, Wi-Fi network or any other equivalent network or combination thereof apt to establish a connection, at least in part wireless, between the cellular phones 120, 130 and the network equipment 1.

As GPRS, GSM, UMTS, EDGE, mobile dial-up, Wi-Fi and equivalent technologies are well known in the art, they will not be further described in detail hereinafter.

The mobile network 10 has associated a gateway 165 that may be of the GSM SMS-C, MMS or 3GPP IMS or equivalent type and which allows SMS messages (and/or MMS, 3GPP IMS messages or in general multimedia contents) to be exchanged between the network equipment 1 and the cellular phones 120, 130, according to techniques well known in the art.

For the sake of simplicity, in the following description reference to SMS textual messages will be made, even if it should be clear that the invention applies to MMS, 3GPP IMS and equivalent messages as well.

In the embodiment shown, the network equipment 1 comprises an information server 150 and a location server 170.

The information server 150 is adapted to receive, store and send user messages from/to cellular phones 120, 130, to handle a repository 155 for memorizing introductory user messages (as defined in more detail below) and to handle a user information database 160 for storing and managing information about the cellular phones 120, 130 (and possibly the respective users). For example, as shown in more detail below, for each cellular phone 120, 130, the user information database 160 may store the following (or some of the following) parameters: an internal user identifier (IN_ID), a Bluetooth short-range wireless connection identifier (UID), a MSISDN subscriber identifier, a messaging system connection identifier (UIN), an IP packet data network connection address and a flag indicating the on-line/off-line status within the communication network 100 (that is, whether or not the respective user has given authorization to be discovered and/or to receive messages from other users).

In particular, the internal user identifier (IN_ID) is an identifier generated by the information server 150 for univocally and anonymously identifying the cellular phones 120, 130 (or more properly the SIM associated with such cellular phones), the Bluetooth short-range wireless connection identifier (UID) is an identifier allocated by a Bluetooth transceiver producer which univocally and anonymously identifies a Bluetooth enabled mobile phone 120, the MSISDN subscriber identifier is the Mobile Subscriber ISDN number well known in the art, the messaging system connection identifier (UIN) is a numeric code generated by the information server 150 for univocally and anonymously identifying cellular phones 120, 130 in a messaging system connection as disclosed in detail below, and the IP packet data network connection address is the IP address for univocally identifying cellular phones 120, 130 in a packet data network connection session, as well known in the art. Moreover, the information server 150 is connected to the mobile network 10 for sending/receiving SMS messages to/from cellular phones 120, 130 (through gateway 165) and packet data to/from cellular phones 120.

The information server 150 and the gateway 165 allow anonymous SMS messages to be exchanged between cellular phones 120, 130. For example, a SMS from a sender cellular phone to an addressee cellular phone sent under the control of the information server 150 will have as addressee number the MSISDN subscriber identifier number of the addressee cellular phone and as sender number the concatenation of a predetermined number of digits (the so-called "large account's number") which is associated with the network equipment 1 and the above mentioned messaging system connection identifier (UIN) which, as disclosed above, is a numeric code generated at the network equipment 1 for univocally and anonymously identifying the sender cellular phone. In this way, the MSISDN subscriber identifier of the sender cellular phone is not sent to the addressee cellular phone and anonymity of the user of the sender cellular phone is preserved.

According to an embodiment, the information server 150 may generate a unique messaging system connection identifier UIN for each cellular phone establishing a network connection with it. Alternatively, in order to better exploit the limited number of identifiers that can be generated with a fixed number of digits at its disposal, the information server 150 can generate the identifiers according to another preferred technique. In particular, considering a cellular phone A establishing a network connection with the information server 150, the latter can generate a table for said cellular phone A in which associating a unique messaging system connection identifier UIN of progressively increasing value (e.g. UIN1, UIN2, UIN3 . . . ) for each cellular phone (e.g. cellular phones B, C, D) with which cellular phone A establishes a messaging system connection. In this way, when the information server 150 receives a SMS having has sender number the MSISDN_A of cellular phone A and as addressee number the concatenation of the large-account number and a messaging system connection identifier UINx, it can determine the identity of the addressee cellular phone from the table generated for cellular phone A by looking for the cellular phone with which said UINx has been associated.

The location server 170 is adapted to support the information server 150 for identifying the geographical position of the cellular phones 120, 130.

For example, the location server 170 is adapted to handle a database 175 for storing the geographical position of cellular phones 120, 130 in terms of latitude and longitude information.

Alternative and multiple distinct technologies can be used for localizing a cellular phone. The position information to be stored in the location server 170 may be directly obtained by cellular phones 120, 130 when, for example, they are equipped with a GPS receiver or may be obtained from the mobile network 10 according to techniques well known in the art. Moreover, the geographical position information may be dynamically updated or cached (in order to reduce the network requests for localizing a mobile terminal) according to technologies well known in the art.

The communication network 100 and, in particular, the cellular phones 120, 130, the network equipment 1, the mobile network 10 and the gateway 165 comprise hardware, software and/or firmware elements adapted to implement the methods for managing anonymous communications according to the invention.

FIGS. 2 to 5 show as a whole a flow chart exemplifying the main actions performed at two cellular phones 120 (or, where explicitly stated, 130) #1 and #2 (labelled user #1 and user #2 in the figures) and at the network equipment 1 (labelled Information Server 150), according to an embodiment of the invention.

For the sake of clarity, user #1 and user #2 have been considered with two different roles. In particular, user #1 is the one who discovers and contacts and user #2 is the one discovered. Even if not shown, it should be clear that the two roles (discoverer and discovered) may be played at the same time by the same user.

Figure 2:
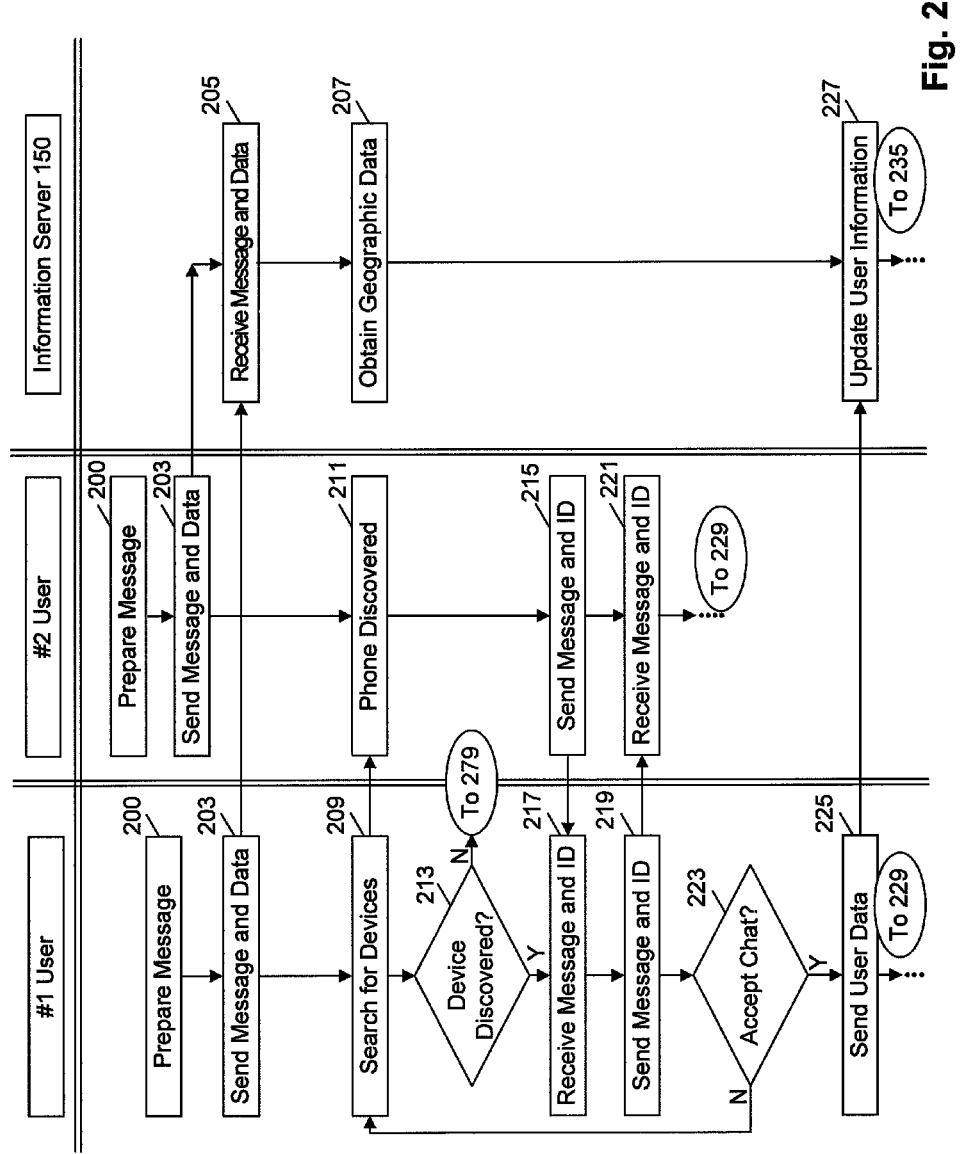
FIGS. 2-5 schematically show a flowchart exemplifying an embodiment of the invention.

In FIG. 2, at block 200 user #1 (and user #2) switches cellular phone #1 (cellular phone #2) on and prepares—through a suitable user interface (e.g. by means of a keyboard and a display unit) in cellular phone #1 (cellular phone #2)—an introductory user message to be communicated to other users.

For example, the introductory user message may be a general unstructured textual/multimedia description or a structured description with fields for providing user personal details (e.g. age, gender, hobbies, email), and user preferences (e.g. looking for teenagers only), in this way allowing the definition of additional search criteria for the search performed at blocks 280, 281 disclosed hereinafter.

At block 203 user #1 (and user #2) enables cellular phone #1 (and cellular phone #2) to run a dedicated application implementing the managing method of the invention so that cellular phone #1 (and cellular phone #2) sends to the information server 150, through a network connection, the introductory user message and user information data. The network connection may be, for example, an IP packet data network connection, a SMS connection or a mixed connection including both. In case of IP packet data network connection, cellular phone #1 (cellular phone #2) is assigned by the mobile network 10 an IP address (IP1, IP2) and the user information data sent to the information server 150 comprise the Bluetooth unique short-range wireless connection identifier (UID1, UID2) and, optionally, the geographical position of the cellular phone. This latter information may be provided when, for example, cellular phone 120 is equipped with a GPS receiver. The IP address is retrieved by the information server 150 from the data sent on the established network connection. Optionally, the information server 150 may retrieve the MSISDN subscriber identifiers (MSISDN1, MSISDN2) of the cellular phones on the basis of the IP addresses, as well known in the art. In case of SMS connection, cellular phone #1 (cellular phone #2) sends a SMS to the large account number of the information server 150 containing the introductory user message and, optionally, the geographical position of the cellular phone. The MSISDN is retrieved by the information server 150 as the sender number of the SMS. In case of mixed connection, cellular phone #1 (cellular phone #2) may send to the information server 150 the introductory user message, the Bluetooth unique short-range wireless connection identifier (UID1, UID2) and, optionally, its geographical position through the established IP packet data network connection. The MSISDN subscriber identifier may be retrieved by the information server 150 through a SMS connection (e.g., by sending from the cellular phone to the information server 150 an empty SMS). A user that at block 203 sends to the information server 150 said introductory user message implicitly gives the authorization to be discovered by other users by means of the location server 175 and to receive messages from the other users, for example for a certain period of time (e.g. 1 hour) after having sent such message.

At block 205, the information server 150 receives the introductory user message and the user information data from cellular phone #1 (cellular phone #2) and, optionally, from other sources of information such as other apparatuses of the mobile network 10; generates the above mentioned internal user identifier (IN_ID1, IN_ID2) for univocally identifying cellular phone #1 (cellular phone #2) and stores the received introductory user message and user information data in the repository 155 and user information database 160, respectively, by using the generated internal user identifier (IN_ID1, IN_ID2). At block 207, if no position information has been sent to the information server 150 from cellular phone #1 (and cellular phone #2), the information server 150 interoperates with the location server 170 in order to obtain information about the geographical position of cellular phone #1 (and cellular phone #2).

Actions at blocks 203, 205 and 207 allow the information server 150 to be aware of the on-line cellular phones running the dedicated application implementing the managing method of the invention, to assign them the internal user identifier (IN_ID) and to store the assigned internal user identifiers and the introductory user messages, UIDs, MSISDNs, IP addresses and the geographical position information of such cellular phones.

Even if not shown, the method of the invention also envisages the case in which user #2 is not currently running the dedicated application implementing the managing method of the invention on cellular phone #2, so that actions at blocks 203, 205 and 207 are not carried out in connection with cellular phone #2. However, this case requires that cellular phone #2 has previously already sent, at least once, its user information data to the information server 150 and that, thus, the latter already has at disposal the user information data of cellular phone #2, stored in the user information database 160.

At block 209, cellular phone #1 performs a short-range wireless search according to Bluetooth wireless technology for discovering Bluetooth enabled cellular phones 120 which are within the Bluetooth range of distances covered by cellular phone #1.

At block 213, it is checked whether cellular phones have been discovered through the short-range wireless search performed at block 209.

Figure 5:
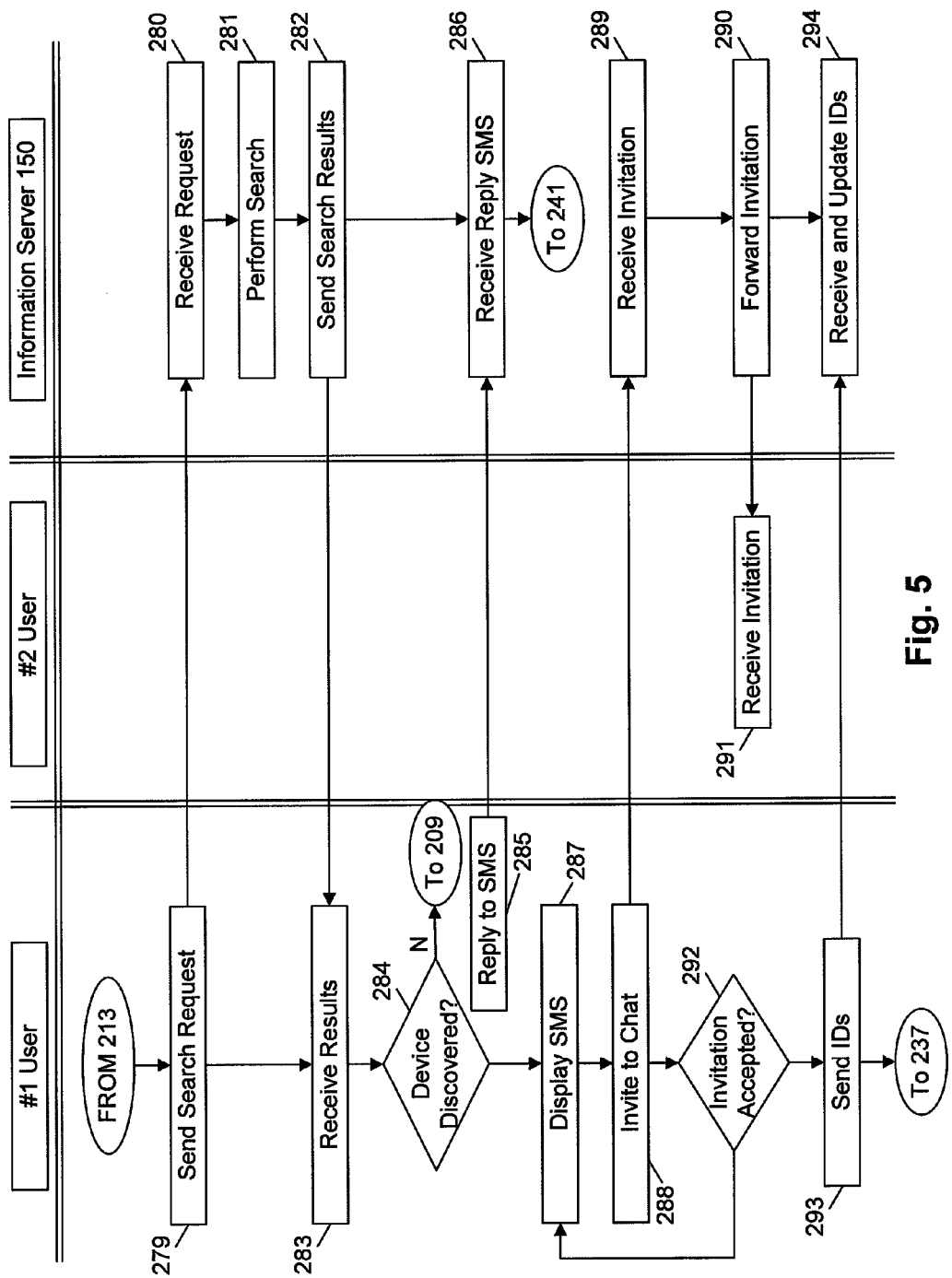

If no cellular phone has been discovered, the procedure continues at block 279 (see FIG. 5).

At block 211, cellular phone #2 is discovered by the short-range wireless search performed at block 209 by cellular phone #1.

At block 215, cellular phone #2 sends the introductory user message prepared at block 200 and its Bluetooth unique short-range wireless connection identifier (UID2) to cellular phone #1.

At block 217 cellular phone #1 receives the introductory user message and the Bluetooth unique short-range wireless connection identifier (UID2) from cellular phone #2 (and, optionally, from other cellular phones found by the search performed at block 209). Then, through its user interface, cellular phone #1 provides user #1 with the introductory message of user #2, typically without displaying the Bluetooth unique short-range wireless connection identifier (UID2) to user #1.

At block 219 cellular phone #1 invites user #2 to chat, preferably by sending the introductory user message prepared at block 200 and the Bluetooth unique short-range wireless connection identifier (UID1) to cellular phone #2.

At block 221, cellular phone #2 receives the introductory user message and the Bluetooth unique short-range wireless connection identifier (UID1) from cellular phone #1 and, through its user interface, provides user #2 with the received user message, typically without displaying the Bluetooth unique short-range wireless connection identifier (UID1) of cellular phone #1 to user #2.

At block 223, it is checked whether user #2 accepts the invitation to chat.

If user #2 does not accept the invitation, user #1 may decide to perform a new search at block 209. Otherwise, even if not shown, he/she can try to invite a different user, if any, among those discovered at block 209 or to terminate the execution of the dedicated application implementing the managing method of the invention.

If user #2 accepts the invitation, at block 225 cellular phone #1 sends such information (e.g. by communicating the Bluetooth unique short-range wireless connection identifier UID1 and UID2 of cellular phones #1 and #2) to the information server 150 that, at block 227, updates the user information database 160 accordingly. In this way, the information server 150 is aware that user #1 and #2 established a short-range wireless connection.

At blocks 229 the two users #1 and #2 communicate (e.g. by exchanging text, image, audio messages) through a Bluetooth short-range wireless connection.

At block 231 it is checked whether the Bluetooth short-range wireless connection is on.

In the affirmative case, users #1 and #2 continue staying in touch and communicating at block 229 until they wish so, or until they remain within the available Bluetooth short-range of distances. During this time, both of them can be discovered by other users, and consequently start chatting with them in a way similar to what disclosed above.

If the Bluetooth short-range wireless connection fails (e.g. users #1 and #2 find themselves outside the Bluetooth short-range of distances covered by cellular phones), at block 233 cellular phone #1 notifies such event to the information server 150 that, at block 235, receives and stores such information in the user information database 160.

Even if not shown, it can also be provided that if at block 219 the attempt of user #1 to invite user #2 to chat fails because user #2 is not anymore within the Bluetooth short-range of distances covered by cellular phone #1, the procedure skips from block 219 to block 233.

At block 237, cellular phone #1 sends to the information server 150, transparently to user #1 and through a network connection, data comprising the Bluetooth unique short-range wireless connection identifier (UID2) of cellular phone #2 and a message for user #2. The network connection may be, for example, an IP packet data network connection or a SMS connection. In case of IP packet data network connection, cellular phone #1 sends to the information server 150 also its Bluetooth unique short-range wireless connection identifier (UID1) so as to be identified by the information server 150 while its IP address (IP1) is retrieved by the information server 150 itself. In case of SMS connection, the information server 150 retrieves the MSISDN subscriber identifier of the cellular phone #1 (as sender number of the SMS) so as to be identified by the information server 150.

Even if not shown, it can also be provided that at block 237, before sending the data to the information server 150, cellular phone #1 alerts user #1 that the short-range connection with user #2 failed and that the intermediation of information server 150 is intervening. Moreover, user #1 might be provided with the possibility of choosing whether continuing chatting with user #2 through the intermediation of the information server 150 or interrupting it.

At block 239, the information server 150 receives the data from cellular phone #1.

It is noted that actions at blocks 225 and 227 (and 233, 235 too) may also be omitted. In that case, the information server 150 becomes aware that a short-range wireless connection between user #1 and #2 failed at the receipt of said data from cellular phone #1 at block 239.

At block 241 the information server 150 checks in the user information database 160 whether an IP packet data network connection is established with cellular phone #2, by using the Bluetooth unique short-range wireless connection identifier (UID2) received at block 239.

Figure 4:
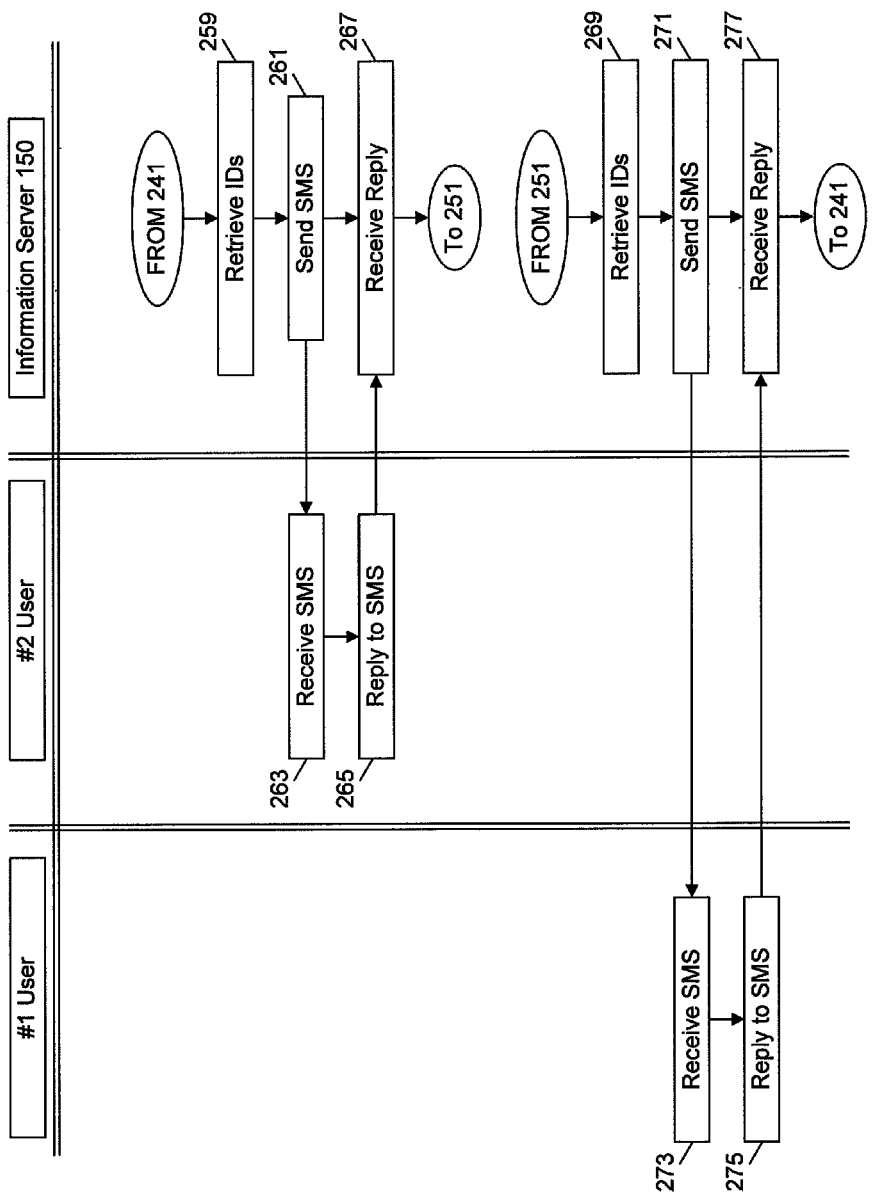

In the negative case, the procedure continues at block 259 (see FIG. 4).

In the affirmative case, at block 243 the information server 150 retrieves the IP address (IP2) associated with the cellular phone #2 from the user information database 160 and sends to cellular phone #2, by using the retrieved IP address, the Bluetooth unique short-range wireless connection identifier (UID1) of cellular phone #1 and the message for user #2 received at block 239 from user #1.

At block 245, cellular phone #2 receives from the information server 150, through the established IP packet data network, the message and the Bluetooth unique short-range wireless connection identifier (UID1) of cellular phone #1 and, through its user interface, provides user #2 with the received user message, typically without displaying the Bluetooth unique short-range wireless connection identifier (UID1) of cellular phone #1 to user #2.

At block 247, user #2 prepares a reply message for user #1 and cellular phone #2 sends data to the information server 150, transparently to, user #2 and through the established IP packet data network. Said data comprise the Bluetooth unique short-range wireless connection identifiers (UID1, UID2) of cellular phone #1 and #2 and the reply message for user #1.

Even if not shown, it can also be provided that at block 247, before sending the data to the information server 150, cellular phone #2 alerts user #2 that the short-range connection with user #1 failed and that the intermediation of information server 150 intervened. Moreover, user #2 might be provided with the possibility of choosing whether continuing chatting with user #1 through the intermediation of the information server 150 or interrupting it.

At block 249, the information server 150 receives the data from cellular phone #2.

Even if not shown, it can be provided that if user #2 does not reply to the message received from the information server 150 at block 245, the information server 150, not receiving any reply from cellular phone #2, notifies it to cellular phone #1. At this point user #1 may decide to perform a new search at block 209, to try to invite a different user, if any, among those already discovered at a previous execution of block 209 (see FIG. 2), or to terminate the execution of the dedicated application implementing the managing method of the invention.

At block 251 the information server 150, by using the Bluetooth unique short-range wireless connection identifier (UID1) received at block 249, checks in the user information database 160 whether an IP packet data network connection is established with cellular phone #1.

In the negative case, the procedure continues at block 269 (see FIG. 4).

In the affirmative case, at block 253 the information server 150 retrieves the IP address (IP1) associated with the cellular phone #1 from the user information database 160 and sends to cellular phone #1, by using the retrieved IP address, the Bluetooth unique short-range wireless connection identifier (UID2) of cellular phone #2 and the reply message for user #1, received at block 249 from user #2.

At block 255, cellular phone #1 receives from the information server 150, through the established IP packet data network connection, the reply message and the Bluetooth unique short-range wireless connection identifier (UID2) of cellular phone #2 and, through its user interface, provides user #1 with the received user message, typically without displaying the Bluetooth unique short-range wireless connection identifier (UID2) of cellular phone #2 to user #1.

At block 257, at cellular phone #1 it is checked whether user #1 wishes to continue chatting with user #2.

In the affirmative case, users #1 and #2 continue chatting through the intermediation of the information server 150 continuing the procedure at block 237.

Moreover (not shown), it can be provided that cellular phones #1 and #2 attempt to establish again a Bluetooth short-range wireless connection and, in case of success, that users #1 and #2 start again chatting through the newly established Bluetooth short-range wireless connection continuing the procedure at block 229.

If at block 257 user #1 does not wish to continue chatting with user #2, he/she may decide to perform a new search at block 209. Otherwise, even if not shown, he/she may try to invite a different user, if any, among those already discovered at a previous execution of block 209 (see FIG. 2), or to terminate the execution of the dedicated application implementing the managing method of the invention.

From the actions disclosed above it is clear that the invention allows two users, which start chatting through an anonymous short-range wireless connection, to continue chatting anonymously even when they find themselves outside the short-range of distances covered by their cellular phones. This is achieved thanks to the intervention of the intermediation of the information server 150 and to a suitable management of the UIDs and IP addresses of the cellular phones involved.

FIG. 4 shows the actions to be performed (blocks 259-267 or 269-277) when at block 241 or 251, respectively, the information server 150 finds that there is not an established IP packet data network connection with cellular phone #2 or cellular phone #1.

This may happen, for example, when user #2 and/or user #1 switch their cellular phone off, or when they decide to interrupt the execution of the dedicated application implementing the managing method of the invention in their cellular phones or in case of a cellular phone 130, that is unable to establish packet data network connections.

In particular, at block 259 the information server 150 retrieves from the user information database 160 the MSISDN2 subscriber identifier of user #2 therein associated with the Bluetooth unique short-range wireless connection identifier (UID2) of cellular phone #2, received at block 239 from cellular phone #1. Moreover, it retrieves from the user information database 160 the messaging system connection identifier (UIN1) therein associated with the Bluetooth unique short-range wireless connection identifier (UID1) of cellular phone #1, received at block 239 from cellular phone

1. As already described above, said messaging system connection identifier (UIN1) is a numeric code generated by the information server 150 for univocally identifying a cellular phone when sending anonymous SMS.

At block 261, the information server 150 sends an anonymous SMS to cellular phone #2 through gateway 165. As already described above, the SMS will contain the message from user #1 to user #2 and will have as addressee number the MSISDN2 and as sender number the concatenation of the large account's number which represents the information server 150 and the UIN1. In this way, the MSISDN1 subscriber identifier of cellular phone #1 is not revealed to user #2 and anonymity of user #1 is preserved.

At block 263, cellular phone #2 receives the anonymous SMS from the information server 150 and at block 265 it replies to it.

Figure 3:
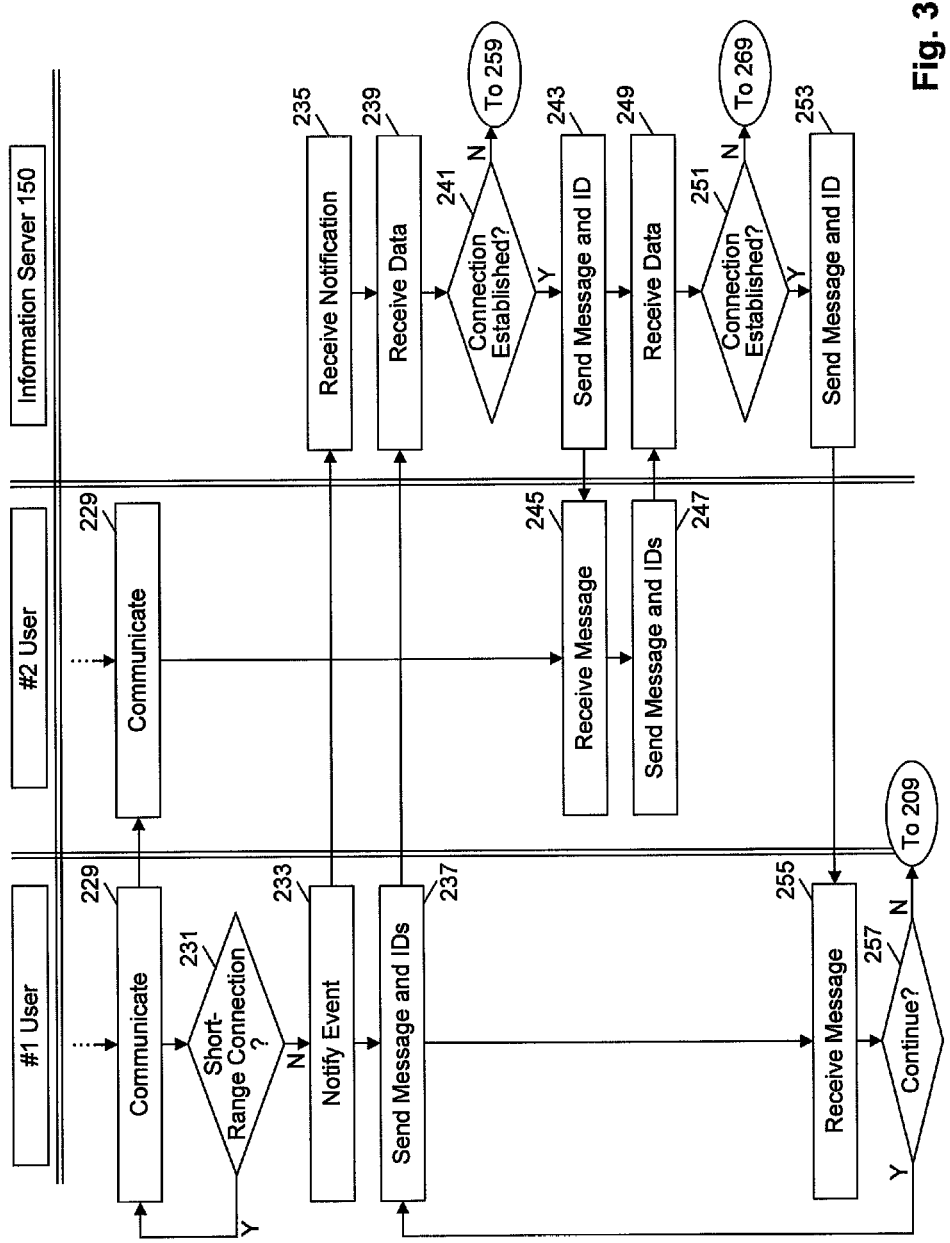

At block 267, the information server 150 receives the reply message from user #2 and examines the sender number (MSISDN2) and the addressee number (large account number+UIN1) so as to identify the sender and addressee cellular phones, as described above. Then the procedure continues at block 251 (FIG. 3).

In its turn, at block 269 the information server 150 retrieves from the user information database 160 the MSISDN1 subscriber identifier of user #1 therein associated with the Bluetooth unique short-range wireless connection identifier (UID1) of cellular phone #1, received at block 249 from cellular phone #2. Moreover, it retrieves from the user information database 160 the messaging system connection identifier (UIN2) therein associated with the Bluetooth unique short-range wireless connection identifier (UID2) of cellular phone #2, received at block 249 from cellular phone #2. As already described above, said messaging system connection identifier (UIN2) is a numeric code generated by the information server 150 for univocally identifying a cellular phone when sending anonymous SMS.

At block 271, the information server 150 sends an anonymous SMS to cellular phone #1 through gateway 165. As already described above, the SMS will contain the message from user #2 to user #1 and will have as addressee number the MSISDN1 and as sender number the concatenation of the large account's number (LAN) which represents the information server 150 and the UIN2. In this way, the MSISDN2 subscriber identifier of cellular phone #2 is not revealed to user #1 and anonymity of user #2 is preserved.

At block 273, cellular phone #1 receives the anonymous SMS from the information server 150 and at block 275 it replies to it.

At block 277, the information server 150 receives the reply message from user #1 and examines the sender number (MSISDN1) and the addressee number (large account number+UIN2) so as to identify the sender and addressee cellular phones, as already described above. Then the procedure continues at block 241.

From the above description, it is clear that actions disclosed with reference to FIG. 4, allow the users to continue communicating anonymously, by the exchange of anonymous SMS through the intermediation of the information server 150, even when they find themselves outside the short-range of distances covered by their cellular phones and they have not an established packet data network connection with the network equipment 1. This is achieved thanks to the intervention of the intermediation of the information server 150 and to a suitable management of the MSISDNs of the cellular phones involved.

Even, if not shown, it can also be provided that—when at block 241 the information server 150 finds that an IP packet data network connection is not established with cellular phone #2—instead of implementing block 259 of FIG. 4, it forces cellular phone #2 to launch and to run the dedicated application implementing the managing method of the invention and to establish a packet data network connection with it (e.g., by sending a suitable SMS to the cellular phone #2 that automatically activates such dedicated application) so that the procedure may continue at block 243. In this case, the user is preferably given the possibility of choosing whether or not authorizing this forcing procedure in its cellular phone.

FIG. 5 shows the actions which may be performed when at block 213 cellular phone #1 finds no nearby cellular phone through the short-range wireless search performed at block 209 or when the user of phone #1 decide to enlarge the search.

In particular, at block 279 cellular phone #1 sends to the information server 150 a request for cellular phones search through a network connection.

At blocks 280, 281 the information server 150 receives the request from cellular phone #1 and performs the search with the support of the user information database 160 and the location server 170. For example, the search may be performed by identifying, among the on-line users which have established either a packet data network connection or a SMS connection with the information server 150, those that are closer to the position of the cellular phone. #1. Moreover, in addition to or in place of the proximity, other search criteria may be used as for example the time of last access and/or any other preferred criteria declared by the user, for example during the initial phase at block 200, by preparing the introductory user message with a suitable structured description.

At block 282, the information server 150 sends, through a network connection, the result of the search to the cellular phone #1. Said result typically comprises an anonymous search identifying code univocally associated with each of at least a sub-set of the discovered cellular phones, together with the respective introductory user message. The network connection may be an IP packet data network connection or a SMS connection. In case of IP packet data network connection, the anonymous search identifying code may be the Bluetooth unique short-range wireless connection identifiers (UIDn) and/or the internal user identifiers (IN_ID) for the discovered cellular phones of type 120 and the internal user identifier (IN_ID) for the discovered cellular phones of type 130. These latter cellular phones 130 are discoverable in that they have previously sent, via SMS to the large account number of the information server 150, their respective introductory user messages. In case of SMS connection, the result typically comprises as many SMS as the number of the discovered cellular phones (or no more than a predetermined number), each SMS containing the introductory message of the respective discovered user and having as sender number the concatenation of the large-account number and the UIN associated with the discovered cellular phone.

At block 283, cellular phone #1 receives the result of the search.

At block 284, it is checked whether cellular phones have been discovered through the search performed by the information server 150 at blocks 280, 281.

If no cellular phone has been discovered, user #1 may decide to start again at block 209 (see FIG. 2). Otherwise, even if not shown, it may decide to terminate the execution of the dedicated application implementing the managing method of the invention.

If at least one cellular phone has been found, in case of search result received through the SMS connection at blocks 285 cellular phone #1 through its user interface displays to user #1 the received SMSs and user #1 may decide to reply to at least one of them (e.g. to user #2) by sending a reply SMS to the information server 150. At block 286 the information server 150 receives the reply SMS from cellular phone #1, examines the sender number (MSISDN1) and addressee number (e.g. large-account number+UIN2) to identify the sender and addressee cellular phone and the procedure continues at block 241 (FIG. 3).

If at least one cellular phone has been found in case of search result received through the IP packet data network connection, at block 287 cellular phone #1, through its user interface, displays to user #1 the introductory user messages of the discovered users.

At block 288 user #1 decide to invite to chat at least one of them (e.g. user #2) by sending to he/she the introductory user message prepared at block 200. The cellular phone #1 sends also the Bluetooth unique short-range wireless connection identifiers UID1 and the UID2 (or the received internal user identifier (IN_ID2) for the selected user #2) to the information server 150.

At block 289, the information server 150 receives the introductory user message, the Bluetooth unique short-range wireless connection identifiers UID1 and UID2 (or the internal identifier for user #2) from cellular phone #1 and at block 290 forward the invitation to chat to cellular phone #2 via an IP packet data network connection or SMS connection, in a way similar to what already disclosed above.

At block 291, cellular phone #2 receives the invitation to chat and, through its user interface, provides user #2 with the received message.

User #2 can decide whether or not to accept the invitation. The decision is communicated to the information server 150 (e.g. by not replying to the received message, or by communicating the decision via IP packet data network connection) which in turns forwards user #2's decision to user #1 (actions not shown in FIG. 5).

At block 292, it is checked whether user #2 accepts the invitation to chat.

If user #2 does not accept the invitation, user #1 may decide to try to invite a different user, if any, among those previously discovered from the information server 150 and to start again the procedure at block 287. Otherwise, even if not shown, he/she may decide to perform a new search either at block 279 or at block 209, or to terminate the execution of the dedicated application which implements the managing method of the invention in cellular phone #1.

If user #2 accepts the invitation, at block 293 cellular phone #1 sends such information (e.g. by communicating the Bluetooth unique short-range wireless connection identifier UID1 of cellular phone #1 and the received UID2 or internal identifier for user #2) to the information server 150 that, at block 294, updates the user information database 160 accordingly. In this way, the information server 150 is aware that user #1 and #2 established a connection.

At this point the procedure can continue at block 237.

It is noted that actions at blocks 293 and 294 may also be omitted. In that case, the information server 150 becomes aware that user #2 accepted the invitation of user #1 at the receipt, at block 239, of a message from cellular phone #1 addressed to cellular phone #2.

From actions 279 to 294 disclosed with reference to FIG. 5, it is clear that the invention allows users to perform an extended search (in terms both of covered ranges of distances and search criteria) with respect to the short-range search performed at block 209 (FIG. 2) and to establish an anonymous connection with the discovered user(s), thanks to the intermediation of the information server 150.

Moreover, it is noted that actions from 279 to 286, in case of SMS connection, shown in FIG. 5 (and clearly the steps 259-267 and 269-277 of FIG. 4) may also be performed in case the cellular phones involved are cellular phones 130 having reduced capability with respect to cellular phones 120 (that is, by a cellular phone which is unable to establish Bluetooth short-range wireless connections, to run dedicated applications and to establish packet data network connections but which has at least the capability of sending and receiving SMS or equivalent type of messages).

This allows anonymous interactions (discovery and/or chatting) between cellular phones 120 and cellular phones 130 to be performed, through the intervention of the information server 150. For example, it enables cellular phone 130, which has not the possibility of performing a Bluetooth short-range wireless search as executed by cellular phones 120 at block 209, to discover other cellular phone users and to chat with the discovered users (if any) through the intermediation of the information server 150.

The invention claimed is:

1. A method for managing in network equipment of a communication network anonymous communications between a first user and a second user, said communications comprising exchange of at least one message through an anonymous short-range wireless connection between a first mobile user apparatus associated with the first user and a second mobile user apparatus associated with the second user, when the short-range wireless connection fails, the method comprising:
   a) receiving from the first mobile user apparatus, through a first network connection, data comprising a second unique short-range wireless connection identifier associated with the second mobile user apparatus and the message for the second user;
   b) by using said second unique short-range wireless connection identifier, obtaining a network address associated with the second mobile user apparatus; and
   c) by using the network address obtained in b), sending data to the second mobile user apparatus through a second network connection, said data comprising the message received in a) from the first mobile user apparatus and a first anonymous identifying code univocally associated with the first mobile user apparatus.

2. The method according to claim 1, further comprising: d) receiving data from the second mobile user apparatus through the second network connection, said data comprising the first anonymous identifying code associated with the first mobile user apparatus and a message for the first mobile user apparatus.

3. The method according to claim 2, further comprising: e) obtaining a network address associated with the first mobile user apparatus by using the first anonymous identifying code.

4. The method according to claim 3, further comprising: f) sending data to the first mobile user apparatus through the first network connection using the network address obtained in e), said data comprising the message received in d) from the second mobile user apparatus and a second anonymous identifying code univocally associated with the second mobile user apparatus.

5. The method according to claim 1, wherein a) comprises receiving from the first mobile user apparatus a notification that the short-range wireless connection failed.

6. The method according to claim 1, wherein the first network connection in a) is a packet data network connection.

7. The method according to claim 6, wherein in a) the data further comprise a first unique short-range wireless connection identifier associated with the first mobile user apparatus.

8. The method according to claim 1, wherein b) comprises checking whether a packet data network connection is established with the second mobile user apparatus and, if a packet data network connection is established, in c) the data are sent to the second mobile user apparatus through the established packet data network connection.

9. The method according to claim 8, wherein in c) the first anonymous identifying code is a first unique short-range wireless connection identifier.

10. The method according to claim 1, wherein the network address obtained in b) is a second mobile subscriber ISDN number subscriber identifier associated with the second mobile user apparatus, and in c) the data are sent to the second mobile user apparatus through a messaging system connection by using said second mobile subscriber ISDN number subscriber identifier.

11. The method according to claim 10, wherein in c) the first anonymous identifying code is a first messaging system connection identifier.

12. The method according to claim 1, further comprising:
h) receiving from the first mobile user apparatus, through the first network connection, a request for a search for other mobile user apparatuses.

13. The method according to claim 12, further comprising:
i) searching for other mobile user apparatuses in a user information database and l) sending through the first network connection the result of the search performed in i) to the first mobile user apparatus.

14. The method according to claim 13, wherein in i) the search is performed based upon geographical position information stored in said user information database for said other mobile user apparatuses.

15. The method according to claim 13, further comprising:
m) receiving data from the first mobile user apparatus through the first network connection, said data comprising an anonymous search identifying code univocally associated with a mobile user apparatus selected from those sent in l) and a message for such selected mobile user apparatus.

16. Network equipment adapted to carry out the method according to claim 1.

17. A method for managing in a first mobile user apparatus anonymous communications with a second mobile user apparatus within a communication network comprising network equipment, the first and second mobile user apparatus each having associated therewith a first and a second unique short-range wireless connection identifier, respectively, comprising:
1) establishing a short-range wireless connection with the second mobile user apparatus; and
2) when the short-range wireless connection fails, sending to the network equipment, through a network connection, data comprising the second unique short-range wireless connection identifier and a message for the second mobile user apparatus, the message including text data, multimedia data or voice packet data from the first mobile user apparatus for display on the second mobile user apparatus.

18. The method according to claim 17, further comprising:
3) receiving from said network equipment, through said network connection, data comprising an anonymous identifying code univocally associated with the second mobile user apparatus and a message from the second mobile user apparatus.

19. The method according to claim 18, further comprising:
4) sending to said network equipment, through said network connection, data comprising the anonymous identifying code univocally associated with the second mobile user apparatus as received in 3), and a message for the second mobile user apparatus.

20. The method according to claim 17, further comprising sending to the network equipment, through said network connection, a request for a search for other mobile user apparatuses.

21. The method according to claim 20, further comprising receiving from the network equipment, through said network connection, the result of said search.

22. The method according to claim 17, wherein in 2) the network connection is a packet data network connection.

23. The method according to claim 22, wherein step 2) further comprises sending to the network equipment the first unique short-range wireless connection identifier.

24. A mobile user apparatus adapted to carry out the method according to claim 17.

25. A communication network comprising:
network equipment;
a first mobile user apparatus and a second mobile user apparatus each having associated therewith a first and a second unique short-range wireless connection identifier, respectively, the first mobile user apparatus being adapted to carry out a method comprising:
1) establishing an anonymous short-range wireless connection with the second mobile user apparatus;
2) when the anonymous short-range wireless connection with the second mobile user apparatus fails, sending to the network equipment, through a first network connection, data comprising the second unique short-range wireless connection identifier and a message for the second mobile user apparatus, the message including text data, multimedia data or voice packet data from the first mobile user apparatus for display on the second mobile user apparatus;
the network equipment being adapted to carry out a method for managing anonymous communications between the first and the second mobile user apparatus when the anonymous short-range wireless connection between the first and the second mobile user apparatus fails, the method comprising:
a) receiving from the first mobile user apparatus, through the first network connection, the data comprising the second unique short-range wireless connection identifier associated with the second mobile user apparatus and the message for the second mobile user apparatus;
b) by using said second unique short-range wireless connection identifier, obtaining a network address associated with the second mobile user apparatus; and
c) by using the network address obtained in b), sending data to the second mobile user apparatus through a second network connection, said data comprising the message received in a) from the first mobile user apparatus and a first anonymous identifying code univocally associated with the first mobile user apparatus; and
a mobile network,
wherein the first mobile user apparatus and the second mobile user apparatus are each adapted to communicate with the network equipment through a respective network connection via the mobile network.

26. A method for managing in a communication network anonymous communications between a first user and a second user, said communications comprising exchange of at least one message through an anonymous short-range wireless connection between a first mobile user apparatus associated with the first user and a second mobile user apparatus associated with the second user, the first and second mobile user apparatus each having associated a first and a second unique short-range wireless connection identifier, respectively, the first mobile user apparatus and the second mobile user apparatus establishing the anonymous short-range wireless connection with each other using the first and the second unique short-range wireless connection identifiers, the method comprising:

a step of coping with a failure of the anonymous short-range wireless connection, including:

when the short-range wireless connection fails, the first mobile user apparatus sending to a network equipment, through a first network connection, data comprising the second unique short-range wireless connection identifier and the message for the second user; and at the receipt of said data, the network equipment enabling the first mobile user apparatus to continue the anonymous communication with the second mobile user apparatus by:

obtaining a network address of the second mobile user apparatus; and by using the network address thus obtained, sending data to the second mobile user apparatus through a second network connection, said data comprising the message received from the first mobile user apparatus and a unique first anonymous identifying code of the first mobile user apparatus.

27. The method according to claims 26, wherein, when the short-range wireless connection is no longer preferred, the first mobile user apparatus sends to the network equipment, through the first network connection, data comprising the second unique short-range wireless connection identifier and a message to be sent to the second mobile user apparatus, and at the receipt of said data, the network equipment enables the first mobile user apparatus to continue the anonymous communication with the second mobile user apparatus by:

obtaining the network address of the second mobile user apparatus; and by using the obtained network address, sending data to the second mobile user apparatus through the second network connection, said data comprising the message received from the first mobile user apparatus and a unique first anonymous identifying code of the first mobile user apparatus.

* * * * *